United States Patent
Morozov (10) Patent No.: US 10,831,724 B2
(45) Date of Patent: Nov. 10, 2020

(54) METHOD OF RECONCILING RESOURCES IN THE METADATA HIERARCHY

(75) Inventor: Vitaly Morozov, Irvine, CA (US)

(73) Assignee: BMC Software, Inc., Houston, TX (US)

( * ) Notice: Subject to any disclaimer, the term of this patent is extended or adjusted under 35 U.S.C. 154(b) by 262 days.

(21) Appl. No.: 12/570,628

(22) Filed: Sep. 30, 2009

(65) Prior Publication Data

US 2010/0161577 A1 Jun. 24, 2010

Related U.S. Application Data

(60) Provisional application No. 61/139,005, filed on Dec. 19, 2008.

(51) Int. Cl.
*G06F 16/21* (2019.01)
*G06F 16/2457* (2019.01)
(Continued)

(52) U.S. Cl.
CPC ........ *G06F 16/21* (2019.01); *G06F 16/24573* (2019.01); *G06F 16/285* (2019.01); *G06F 16/25* (2019.01); *G06Q 10/00* (2013.01)

(58) Field of Classification Search
CPC ......... G06F 17/30566; G06F 17/30371; G06F 17/30286; G06F 17/30557;
(Continued)

(56) References Cited

U.S. PATENT DOCUMENTS 5,392,390 A * 2/1995 Crozier ............... G06F 15/0208
715/751
5,761,505 A 6/1998 Golson
(Continued)

OTHER PUBLICATIONS

"BMC Atrium CMDB 7.5.00, User's Guide", 71 pgs, Jan. 2009.
(Continued)

*Primary Examiner* — Alford W Kindred
*Assistant Examiner* — Cecile H Vo
(74) *Attorney, Agent, or Firm* — Brake Hughes Bellermann LLP (57) ABSTRACT

An enhanced resource reconciliation process is disclosed to examine the metadata hierarchy of unidentified instances of configuration objects within a particular "data partition" (sometimes called a dataset) of an enterprise configuration management database (CMDB) and perform reconciliation against a target dataset, such as a golden, i.e., production, dataset. The enhanced reconciliation process could identify against instances in the production dataset that are of the same class as the unidentified instance—as well as instances that come from any "candidate" classes. Candidate classes could consist of, e.g., classes upstream or downstream from the unidentified instance in the metadata hierarchy. By allowing the specification of one or more reconciliation properties, such as, "identify downstream," "identify upstream," "identify upstream and downstream," or "identify resources of the same class only," the enhanced resource reconciliation process could perform identification and resource reconciliation against instances of any class in the unidentified instance's metadata hierarchy.

24 Claims, 8 Drawing Sheets

(51) Int. Cl.
*G06F 16/28* (2019.01)
*G06Q 10/00* (2012.01)
*G06F 16/25* (2019.01)

(58) Field of Classification Search
CPC ......... G06F 17/30598; G06F 17/30283; G06F 17/30498; G06F 17/30595; G06F 17/30011; G06F 17/30696; G06F 17/30707; G06F 9/465; G06F 17/30085; G06F 17/30115; G06F 17/30893; G06F 3/067; G06F 9/44505; G06F 16/21; G06F 16/245; G06F 16/273; G06F 16/288; G06F 16/2308; G06F 16/24573; G06F 16/23; G06F 16/25; G06Q 10/00
USPC ...... 707/999.001–7, 999.101–107, 736, 740, 707/691, 705, 737, 802, 99.102, E17.089, 707/999.1, 797, 803, 999.003, 999.102, 707/956, 999.103, E17.008, E17.044, 707/E17.09, E17.032, 999.01, E17.005, 707/E17.01, 610, 999.107; 709/224, 220, 709/223, 201; 715/771, 751; 705/29, 4
See application file for complete search history.

(56) References Cited

U.S. PATENT DOCUMENTS

| | | | |
|---|---|---|---|
| 5,948,055 A * | 9/1999 | Pulsipher | H04L 41/22 709/202 |
| 5,991,877 A | 11/1999 | Luckenbaugh | |
| 6,041,058 A | 3/2000 | Flanders et al. | |
| 6,212,266 B1 | 4/2001 | Busuioc | |
| 6,266,513 B1 | 7/2001 | Briancon | |
| 6,286,047 B1 | 9/2001 | Ramanathan et al. | |
| 6,336,138 B1 | 1/2002 | Caswell et al. | |
| 6,496,838 B1 | 12/2002 | Zamora-Mckelvy et al. | |
| 6,820,090 B2 | 11/2004 | Chambers | |
| 6,836,798 B1 | 12/2004 | Adams | |
| 7,003,402 B2 | 2/2006 | Christie | |
| 7,082,426 B2 | 7/2006 | Musgrove et al. | |
| 7,146,380 B2 | 12/2006 | Schaepe et al. | |
| 7,155,427 B1 | 12/2006 | Prothia et al. | |
| 7,346,044 B1 | 3/2008 | Chou et al. | |
| 7,380,025 B1 | 5/2008 | Riggins et al. | |
| 7,395,256 B2 | 7/2008 | Ji et al. | |
| 7,693,731 B1 * | 4/2010 | Weber | G06Q 10/10 705/4 |
| 8,166,002 B2 * | 4/2012 | Robinson | G06F 16/2308 707/694 |
| 8,554,750 B2 | 10/2013 | Rangarajan et al. | |
| 8,683,032 B2 | 3/2014 | Spinelli et al. | |
| 8,712,979 B2 | 4/2014 | Morozov et al. | |
| 8,799,436 B2 | 8/2014 | Ayachitula et al. | |
| 9,323,801 B2 | 4/2016 | Morozov et al. | |
| 10,127,296 B2 * | 11/2018 | Rangarajan | G06F 16/27 |
| 10,523,543 B2 | 12/2019 | Spinelli et al. | |
| 2002/0002555 A1 | 1/2002 | Wolman | |
| 2002/0009085 A1 | 1/2002 | Barkai et al. | |
| 2002/0143935 A1 | 10/2002 | Schenkel et al. | |
| 2002/0184529 A1 | 12/2002 | Foster et al. | |
| 2003/0058813 A1 | 3/2003 | Viola et al. | |
| 2003/0126108 A1 | 7/2003 | Martino | |
| 2004/0019672 A1 | 1/2004 | Das | |
| 2004/0025157 A1 | 2/2004 | Blight et al. | |
| 2004/0143600 A1 | 7/2004 | Musgrove | |
| 2004/0146008 A1 | 7/2004 | Conradt et al. | |
| 2004/0220963 A1 | 11/2004 | Chen | |
| 2004/0264435 A1 | 12/2004 | Chari et al. | |
| 2005/0038889 A1 | 2/2005 | Frietsch | |
| 2005/0080613 A1 | 4/2005 | Colledge | |
| 2005/0111362 A1 | 5/2005 | Freytsis et al. | |
| 2005/0216433 A1 | 9/2005 | Bland | |
| 2005/0234973 A1 | 10/2005 | Zeng | |
| 2006/0059253 A1 | 3/2006 | Goodman et al. | |
| 2006/0064481 A1 | 3/2006 | Baron et al. | |
| 2006/0069801 A1 | 3/2006 | Rich et al. | |
| 2006/0080656 A1 | 4/2006 | Cain et al. | |
| 2006/0106590 A1 | 5/2006 | Tseng et al. | |
| 2006/0123104 A1 | 6/2006 | Spinelli et al. | |
| 2006/0123393 A1 | 6/2006 | Atkins et al. | |
| 2006/0136459 A1 * | 6/2006 | Trinon | G06Q 10/06 |
| 2006/0136585 A1 * | 6/2006 | Mayfield | G06F 7/14 709/224 |
| 2006/0179124 A1 | 8/2006 | Stefaniak et al. | |
| 2006/0271341 A1 | 11/2006 | Brown et al. | |
| 2007/0150562 A1 * | 6/2007 | Stull | G06F 16/20 709/223 |
| 2007/0239700 A1 | 10/2007 | Ramachandran | |
| 2008/0021917 A1 * | 1/2008 | Baker | H04L 41/08 |
| 2008/0183724 A1 | 7/2008 | Mueller | |
| 2008/0301081 A1 | 12/2008 | Karnik et al. | |
| 2009/0063562 A1 * | 3/2009 | Dinger | G06F 16/25 |
| 2009/0094462 A1 | 4/2009 | Madduri | |
| 2009/0319932 A1 * | 12/2009 | Robinson | G06F 16/2308 715/771 |
| 2010/0161577 A1 | 6/2010 | Morozov | |
| 2011/0238637 A1 | 9/2011 | Morozov et al. | |
| 2012/0259812 A1 | 10/2012 | Rangarajan et al. | |
| 2013/0007011 A1 | 1/2013 | Setlur et al. | |
| 2014/0143416 A1 | 5/2014 | Spinelli et al. | |
| 2014/0195504 A1 | 7/2014 | Morozov et al. | |
| 2014/0279992 A1 | 9/2014 | Morozov | |
| 2016/0196307 A1 | 7/2016 | Morozov et al. | |

OTHER PUBLICATIONS

"BMC Atrium CMDB 7.5.00 Patch 001, Normalization and Reconciliation Guide", 132 pgs, Mar. 2009.
"Configuration Management Database (CMDB) Federation Specification", Document No. DSP0252, Version: 1.0.0, 73 pgs, Jun. 22, 2009.
"BMC Atrium Core 7.6.00; Concepts and Planning Guide", (Sep. 2009), 1-164 pages.
"BMC Atrium Core 7.6.00; Normalization and Reconciliation Guide", (Sep. 2009), 1-148 pages.
"BMC Atrium Core 7.6.00; User's Guide", (Sep. 2009), 1-78 pages.
U.S. Appl. No. 13/082,194 Non-Final Office Action dated Jun. 21, 2012, 24 pages.
U.S. Appl. No. 12/860,334 Non-Final Office Action dated Jun. 22, 2012, 15 pages.
European Search Report dated Apr. 3, 2006 (05257482.9).
"The Four Challenges of Customer-Centric Data Warehousing" Carleton Corporation. Nov. 1998, (Nov. 1998), 16 pages.
U.S. Appl. No. 12/860,334 Final Office Action dated Oct. 5, 2012, 23 pages.
Office Action Response filed for U.S. Appl. No. 13/082,194, filed Nov. 21, 2012, 16 pages.
Office Action Response filed for U.S. Appl. No. 12/860,334, filed Nov. 21, 2012, 13 pages.
Final Office Action Response filed for U.S. Appl. No. 11/295,363, filed Jan. 18, 2013, 14 pages.
Non Final Office Action mailed for U.S. Appl. No. 11/295,363, dated Apr. 3, 2013, 23 pages.
Non Final Office Action Response filed for U.S. Appl. No. 11/295,363, filed Jul. 3, 2013, 18 pages.
Final Office Action Response filed for U.S. Appl. No. 13/082,194, filed Apr. 3, 2013, 12 pages.
Notice of Allowance dated Nov. 4, 2013, for U.S. Appl. No. 11/295,363, 23 pages.
Notice of Allowance dated Dec. 17, 2013, for U.S. Appl. No. 12/860,334, 13 pages.
Extended European Search Report for European Application No. 05257483.7, dated Mar. 31, 2006, 7 pages.
Final Office Action for U.S. Appl. No. 14/164,524, dated Aug. 25, 2016, 20 pages.
Final Office Action for U.S. Appl. No. 14/164,524, dated Sep. 7, 2017, 20 pages.

(56) References Cited

OTHER PUBLICATIONS

Non Final Office Action for U.S. Appl. No. 14/164,524, dated Mar. 3, 2017, 22 pages.
Response to Non Final Office Action for U.S. Appl. No. 14/204,437, filed Aug. 21, 2015, 15 pages.
Response to Restriction Requirement filed in U.S. Appl. No. 14/164,524, filed Dec. 21, 2015, 7 pages.
Non Final Office Action for U.S. Appl. No. 14/164,524, dated Jan. 29, 2016, 13 pages.
Restriction Requirement for U.S. Appl. No. 14/164,524, dated Oct. 30, 2015, 7 pages.
Notice of Allowance for U.S. Appl. No. 14/204,437, dated Dec. 21, 2015, 7 pages.
Non-Final Office Action for U.S. Appl. No. 14/204,437, dated May 21, 2015, 13 pages.

* cited by examiner

Figure 3 "Exemplary Class Hierarchy"

*Figure 4* "Upstream Merger"

*"Downstream Merger"*

METHOD OF RECONCILING RESOURCES IN THE METADATA HIERARCHY

CROSS-REFERENCE TO RELATED APPLICATIONS

This application claims priority to the U.S. Provisional Patent Application Ser. No. 61/139,005, entitled, "A Method of Reconciling Resources in the Metadata Hierarchy," filed on Dec. 19, 2008, which is hereby incorporated by reference in its entirety. This application also claims subject matter that is related to the subject matter described in U.S. patent application Ser. No. 11/204,189, entitled, "Resource Reconciliation," filed on Aug. 15, 2005 and U.S. patent application Ser. No. 11/669,005, entitled, "Configuration Management Database Reference Instance," filed on Jan. 30, 2007, which applications are hereby incorporated by reference in their entireties.

BACKGROUND

This disclosure relates generally to the field of ITIL®-based (Information Technology Infrastructure Library) Configuration Management Databases (CMDBs). (ITIL is a registered trademark of The Lords Commissioners of Her Majesty's Treasury acting through The Office of Government Commerce and Central Computer and Telecommunications Agency, United Kingdom.) ITIL-based CMDBs are emerging as a prominent technology for Enterprise Management Software. In enterprise systems management, data about IT business entities such as servers and applications are generally spread across several repositories, known as Management Data Repositories (MDRs). This data is made available to software applications through various standard and non-standard mechanisms such as Structured Query Language (SQL) and/or other proprietary programming interfaces.

The usefulness of these CMDBs is dependent on the quality, reliability and security of the data stored in them. A CMDB often contains data about managed resources known as Configuration Items (CIs) or configuration objects. In general, CIs correspond to real-world elements, components or objects. ITIL version 3 defines a CI as: "Any Component that needs to be managed in order to deliver an IT Service. Information about each CI is recorded in a Configuration Record within the Configuration Management System and is maintained throughout its Lifecycle by Configuration Management. CIs are under the control of Change Management [systems]. CIs typically include IT Services, hardware, software, buildings, people, and formal documentation such as Process documentation and [Service Level Agreements]."

The CMDB serves as a point of integration between various IT management processes. Typically, a CMDB may be populated with configuration objects by various discovery processes. As different discovery processes may encounter the same object, it is important to identify such situations, and then merge and/or consolidate the information provided by the different processes for each object to avoid creating duplicate objects. This process is often called "reconciliation" or "resource reconciliation," and is described more fully in the document entitled, "BMC Atrium CMDB 7.5.00 Patch 001: Normalization and Reconciliation Guide," which is hereby incorporated by reference in its entirety.

Resource reconciliation processes may consist of two primary operations: 1.) identifying instances of objects of the same type and 2.) merging those instances that can be determined to refer to the same real world object. In the past, reconciliation processes only compared instances of a given class against other instances of the same class, merging the reconciled instances into a single instance of that class at the same level.

What is needed is a means that would make it possible to identify and reconcile instances of different classes and merge them into potentially any class in the same hierarchy.

SUMMARY

This disclosure relates to the field of CMDB resource reconciliation. An enhanced resource reconciliation process in accordance with one embodiment disclosed herein could examine the metadata hierarchy of unidentified instances of configuration objects within a particular "data partition" (sometimes called a dataset) of an enterprise CMDB and perform reconciliation against a target dataset, such as a golden, i.e., production, dataset. The enhanced reconciliation process could identify against instances in the production dataset that are of the same class as the unidentified instance—as well as instances that come from any "candidate" classes. Candidate classes could consist of, e.g., classes upstream or downstream from the unidentified instance in the metadata hierarchy. By allowing the specification of one or more reconciliation properties, such as, "identify downstream," "identify upstream," "identify upstream and downstream," or "identify resources of the same class only," the enhanced resource reconciliation process could perform identification and resource reconciliation against instances of any class in the unidentified instance's metadata hierarchy. An enhanced resource reconciliation process could also allow the specification of individual classes in the unidentified instance's metadata hierarchy against which to perform identification and resource reconciliation.

Datasets are arbitrary partitions of configuration management data. Partitioning is a powerful tool that may be used for many purposes. For example, a particular dataset could represent: production data, obsolete data, a future data state, or data provided by different discovery applications. All datasets within an enterprise environment do not need to contain merely different versions of the same set of CIs and relationships. A particular dataset could also hold, for example: a subset of the enterprise's overall data, such as departments or regions; data from different companies, e.g., in the case of a multitenant architecture; or test data.

A dataset typically comprises a collection of CIs and relationships for a given purpose. Together, they form a picture of some state or time or configuration of the enterprise environment. Within a dataset, there is typically only one instance of a given CI. An instance might also exist for that CI in other datasets to represent the CI in the contexts of those datasets. Instances representing the same CI or relationship across datasets may share the same reconciliation identity, or reconciliation ID.

Reconciling resources in the metadata hierarchy may allow different providers with various maturity levels to populate different classes in their own provider data partitions—but still allow the CMDB to have the ability to merge the instances within the various data partitions into a single, unified resource data partition without duplicates. This approach aims to ensure data integrity and compatibility with existing and future data providers and consumers by providing the ability to reconcile resources that are currently not reconcilable. By eliminating duplicate instances that are undetectable with current technology, this approach can guarantee accurate data in the target data partition.

In one embodiment, a computer system comprising a programmable control device is programmed to perform a resource reconciliation method for a CMDB comprising: accessing information describing one or more unidentified resources; creating a list of candidate classes for each of the one or more unidentified resources, wherein the list of candidate classes is determined by the application of one or more specified reconciliation properties; attempting to reconcile each of the one or more unidentified resources with a previously-identified resource in the CMDB, wherein the act of attempted reconciliation only considers previously-identified resources in the CMDB that are instances of a candidate class; and merging each of the reconciled resources with the corresponding previously-identified resource in the CMDB.

In another embodiment, the instructions for carrying out the above described methods are tangibly embodied on a computer useable memory medium.

In yet another embodiment, a computer network is utilized to carry out the above described methods.

DETAILED DESCRIPTION

Enhanced techniques to reconcile the detection of computational resources (e.g., hardware, software, and services) from a number of different sources are described herein. A method to reconcile multiple instances of a single configuration object identified by resource discovery operations may include: (1) accessing information describing one or more resources; (2) creating, according to specified reconciliation properties, a list of "candidate" classes upstream and downstream from the class of each resource being reconciled; (3) identifying, via the accessed information, the resource being reconciled by comparing its common properties against the common properties of previously-discovered or currently identified resources from among any of the candidate classes; and (4) merging the newly-identified resource instance with the identical, previously-discovered resource instance to create a single, reconciled resource object, wherein the class of the single, reconciled resource object is determined according to the defined reconciliation properties. Illustrative "resources" include, but are not limited to, computer systems, components of computer systems, data storage systems, switches, routers, memory, software applications (e.g., accounting and database applications), operating systems and business services (e.g., order entry or change management and tracking services). The following embodiments, described in terms of a change configuration management system, e.g., a CMDB, are illustrative only and are not to be considered limiting in any respect.

Figure 1:
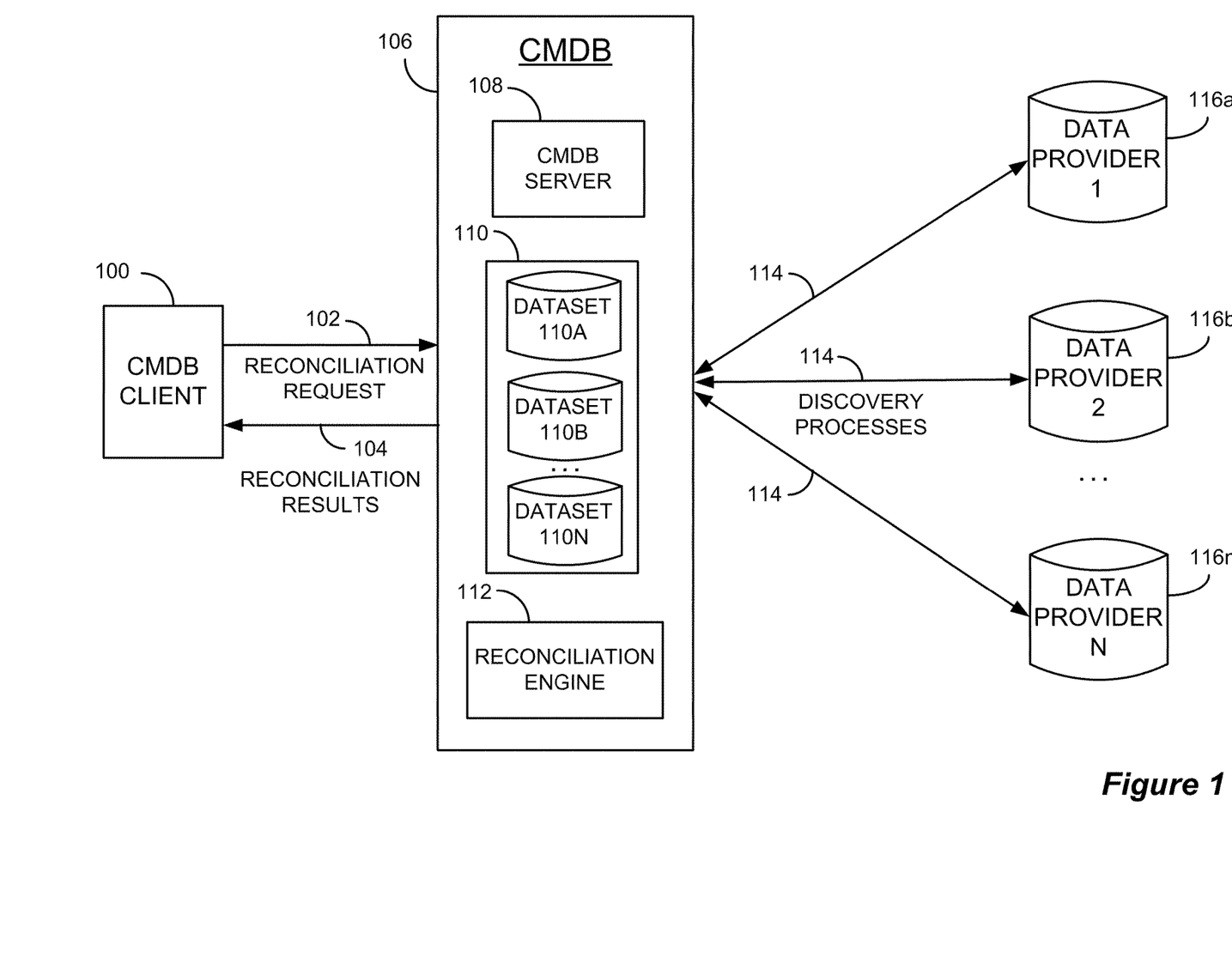
FIG. 1 shows, in block diagram form, an exemplary CMDB and CMDB client application requesting the reconciliation of unidentified configuration object instances, in accordance with one embodiment of the present invention.

FIG. 1 illustrates, in block diagram form, an exemplary CMDB 106, a CMDB client application 100, and a plurality of data providers 116. CMDB 106 may be comprised of a CMDB server 108, a plurality of datasets 110 stored in a memory medium, such as random access memory (RAM) or non-volatile memory sources, and a reconciliation engine 112, described in more detail below. The CMDB 106 may potentially be populated with configuration objects by various different discovery processes 114. As different discovery processes 114 may encounter the same object, it is important to identify such situations, and then merge and/or consolidate the information provided by the different processes for each object to avoid creating duplicate objects.

CMDB client application 100 is capable of defining and executing reconciliation requests that can be triggered to run at various times, e.g., each time a new resource or CI is created in a provider data partition 116, at specified intervals based on scheduling criteria, or on demand. CIs are most often created by discovery applications, such as discovery processes 114. However, CIs may also be created manually. For example, if a new computer system has been installed, and the user does not want to wait until the running of the next scheduled discovery process to include the CI representative of the newly installed computer system in the CMDB, he may create it manually. The CMDB client application 100 may also be engaged by another computer program or process or a human end-user. The CMDB client application 100 may comprise, for example, a user interface where reconciliation properties are defined and the parameters of the reconciliation request are specified. The reconciliation properties may consist of hierarchical limitations on the reconciliation process, for example, an "identify downstream" option, an "identify upstream" option or an "identify upstream and downstream" option, as will be discussed further below. The parameters of the reconciliation request may serve in some manner to otherwise limit the number or types of configuration objects that are considered by the reconciliation process, e.g., a reconciliation request may only look at a specific dataset or may specify specific merging precedences for particular datasets.

The reconciliation request 102 may be sent to the CMDB 106, wherein reconciliation engine 112 can initiate a reconciliation process according to the specified reconciliation properties and parameters, attempting to identify unidentified instances of configuration objects in datasets 100 within the CMDB 106. The results of the reconciliation process 104 may then be returned the client application 100 and displayed to an end user if desired. A goal of some reconciliation processes will be to end up with datasets that are free from duplicated resource objects. The CMDB 106's datasets 110 may have been populated with resource objects via any of various discovery processes 114. Discovery processes 114 may encounter objects from any of various provider data partitions 116 within the enterprise environment.

Figure 2:
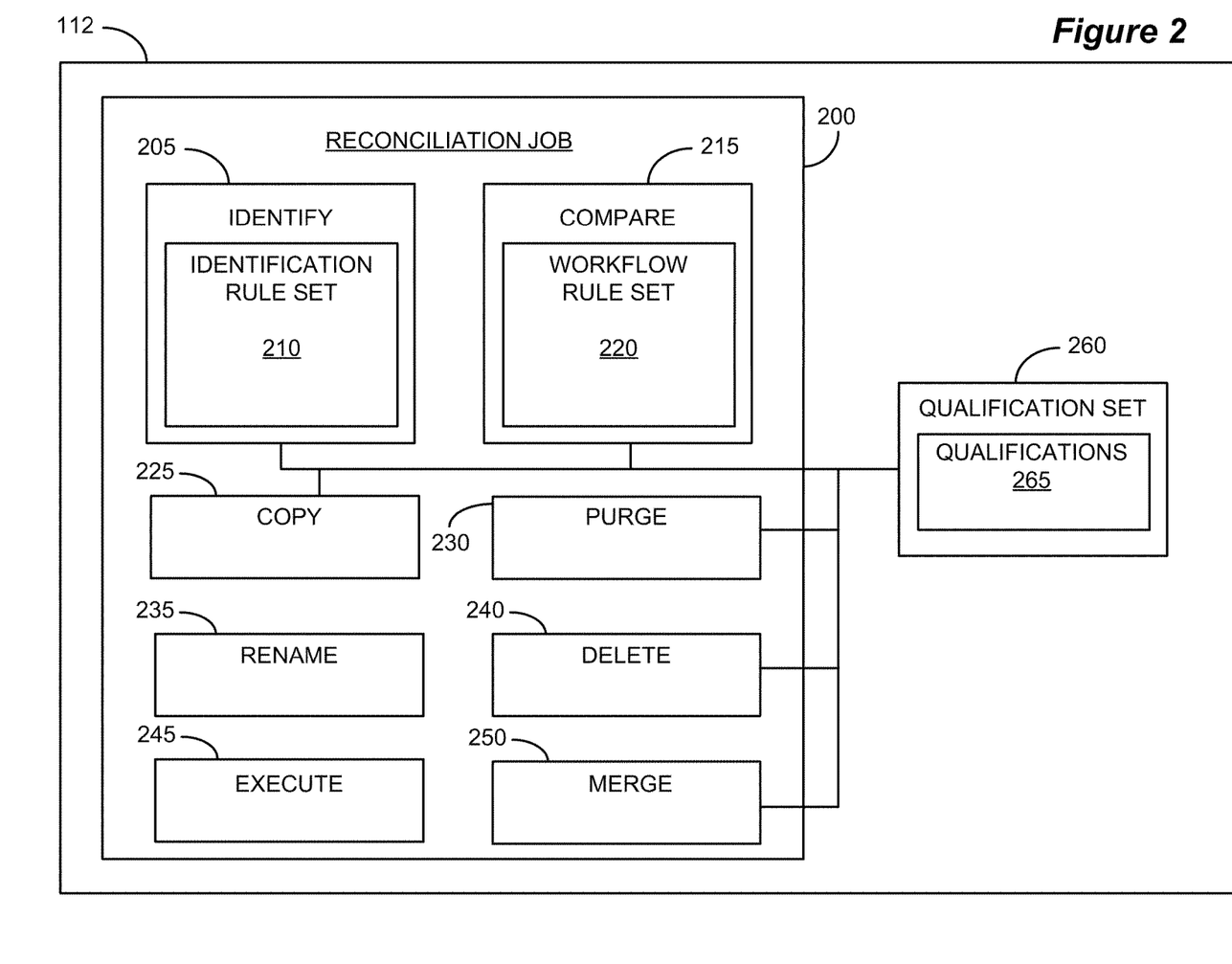
FIG. 2 shows the structure of an exemplary reconciliation job.

FIG. 2 illustrates, in greater detail, the structure of an exemplary reconciliation job 200 running within reconciliation engine 112. The various reconciliation properties and parameters specified in the reconciliation request 102 define the reconciliation job 200. Any number of reconciliation jobs 200 may be running in the reconciliation engine 112 at any given time, if so desired. The reconciliation engine 112 is a component of CMDB 106 that may perform any or all of the following reconciliation activities: identifying class instances that are the same entity in two or more datasets; merging datasets; comparing instances in two or more datasets; copying instances from one dataset to another; deleting instances from one or more datasets; purging instances that are marked as deleted from one or more datasets; and renaming datasets. The reconciliation job 200 is a container for different reconciling modules, which themselves can have different components. A reconciliation job 200 can have one or more modules, each of which defines one or more datasets and rules for that module.

Before different versions of instances can be compared or merged, reconciliation engine 112 must determine that they represent the same entity. Identification module 205 accomplishes this matching by applying rules from an identification rule set 210 against instances of the same (or different, depending on the specified reconciliation properties) classes in two or more datasets. For example, a rule intended to identify computer system instances might specify that the IP addresses of both instances be equal. When the rules find a match, both instances may be tagged with the same reconciliation identity, an extra attribute showing that they each represent the same item in their respective datasets. Instances that fail to be identified by the rules in an Identify module 205 may alternatively be manually identified.

The Compare module 215 operates against instances in two datasets and either produces a report or executes workflow based on the comparison results. The report may show those instances that appear in only one of the datasets and detail the differences between instances that appear in both, for example. The Compare module 215 can compare an expected configuration object against an actual one, which could be used to alert the user that something has changed in a configuration object that was expected to remain static. Only instances that have been given an identity can be compared, and they are compared only against other instances with the same identity. If the reconciliation job 200 executes a predetermined workflow as a result of the comparison instead of creating a report, that workflow will typically execute against instances from one dataset but not both, according to a predetermined workflow rule set 220.

The Copy module 225 may be used to copy instances from one dataset to another. Additional options may be set to determine which relationships and related CIs are copied along with the selected instances.

The Purge module 230 may be used to delete instances that have been marked as deleted from one or more datasets. It may also verify that each instance has also been marked as deleted in another dataset before deleting it. This option may be useful when purging data from a discovery dataset but only instances that are marked as deleted in the "production" dataset should be purged.

The Rename module 235 may be used to rename a dataset. Renaming a dataset does not change the dataset's DatasetId property, so all reconciliation definitions that include the dataset will still work with the new name.

The Delete module 240 may be used to delete instances from one or more datasets. This module does not delete the dataset itself.

The Execute module 245 may be used to execute a reconciliation job. This module may be used to, for example, execute one reconciliation job immediately before or after another.

The Merge module 250 can take two or more datasets and create a composite dataset according to specified precedence, i.e., priority, values. Merging may be used to produce a single, valid configuration when different discovery applications have provided overlapping data about the same CIs. To take advantage of the areas of strength in each dataset, precedence values may be created that favor those strengths, resulting in a single CI instance with the best quality of all discovered data. Typically, only instances that have been given an identity can participate in a merge.

For most reconciliation requests, a qualification set 260 may be specified for the purpose of restricting the instances that participate in a particular reconciliation job. Qualification sets 260, which may be reusable between reconciliation requests, are groups of qualifications 265 that each select certain attribute values. Any instance that matches at least one qualification 265 in a qualification set 260 can participate in an activity that specifies the qualification set. For example, a particular qualification set may select instances that were discovered within the last 24 hours, have a domain attribute with a value of "Frankfurt," and are instances of any class downstream from identified class in the production dataset.

Figure 3:
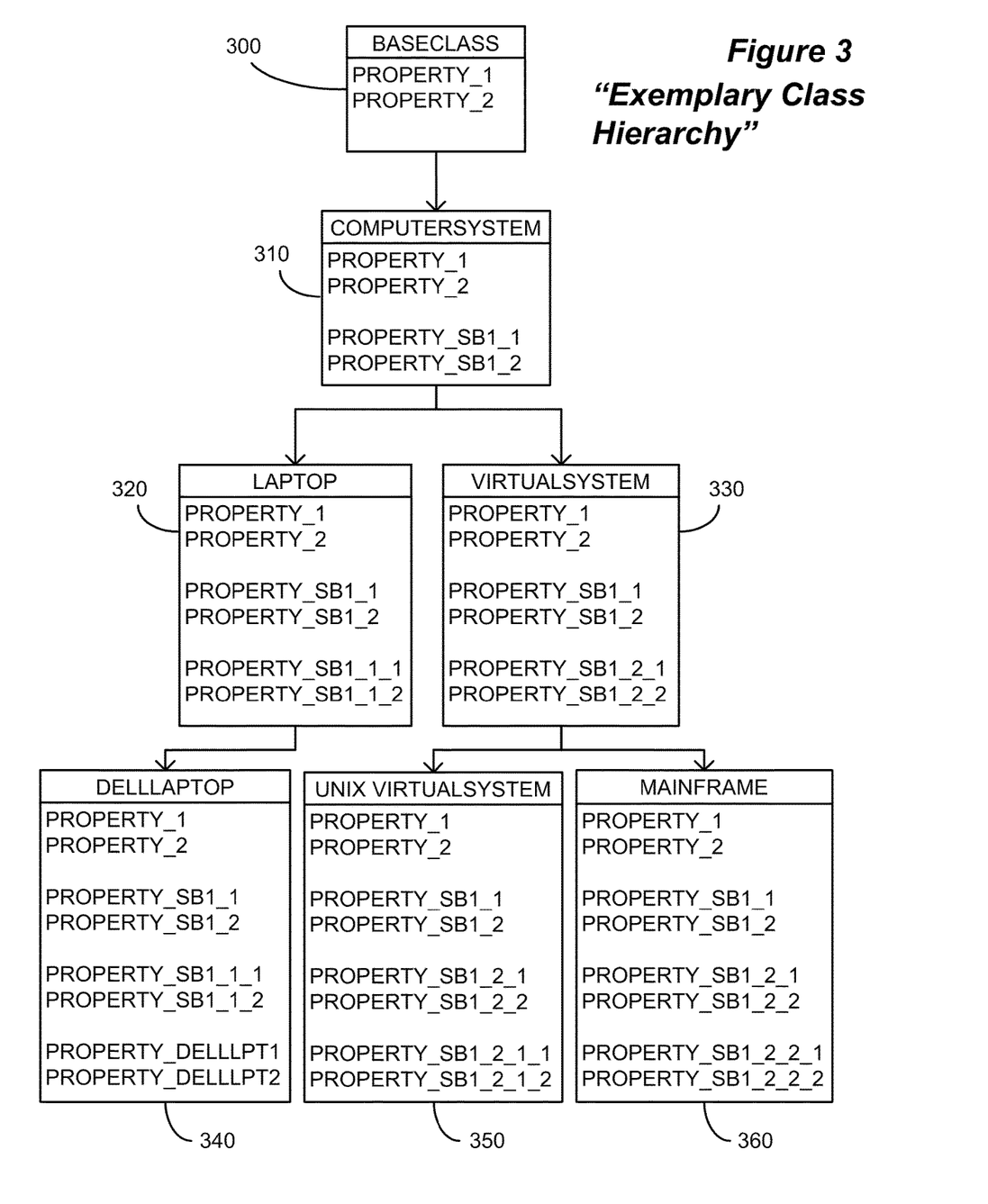
FIG. 3 shows, in block diagram form, an exemplary class hierarchy for a target data partition.

FIG. 3 illustrates an exemplary class hierarchy for a data partition, i.e., dataset, that may be employed in a given enterprise environment. In this exemplary hierarchy, BaseClass 300 is the top-level class in the hierarchy. It is shown to possess two properties, Property_1 and Property_2. Thus, all subclasses of BaseClass 300 likewise possess these two properties. In general, the class hierarchy model is designed such that any subclass possesses all the properties of its parent class in addition to further properties not present in the parent class. BaseClass 300 has subclass ComputerSystem 310, which in turn has two subclasses, Laptop 320 and VirtualSystem 330. Laptop 320 has subclass DellLaptop 340, and VirtualSystem 330 has subclasses UNIX Virtual System 350 and Mainframe 360.

The need for resource reconciliation within a target data partition may arise when, for example, one user or discovery process instantiates a given laptop computer in the enterprise environment as a "ComputerSystem" object 310, and then, later, another user or discovery process instantiates the same laptop computer as a "Laptop" object 320. In this case, two instances of that particular laptop computer would exist in two different classes within the CMDB 106. Prior art resource reconciliation processes only looked to reconcile objects of the same class, and thus would be unable to identify and merge the two laptop computers described in the example above, due to the fact that they were instantiated as different classes.

An enhanced resource reconciliation process, in accordance with one embodiment disclosed herein, could examine unidentified instances of configuration objects in an enterprise environment and perform reconciliation—not just against instances of the same class as the unidentified instance in the target data partition—but could also examine the unidentified instance's class metadata and generate a tree of all "candidate" classes, i.e., classes upstream or downstream from the unidentified instance. By allowing a user or other program to specify reconciliation properties, such as an "identify downstream" option, an "identify upstream option" or an "identify upstream and downstream" option, the enhanced resource reconciliation process could perform identification and resource reconciliation not only against instances of configuration objects in the unidentified instance's class, but instances of configuration objects in any of the desired candidate classes as well. An enhanced resource reconciliation process could also allow for the specification of individual classes to perform identification and resource reconciliation against.

For example, with reference to FIG. 3, an unidentified instance(s) of the "ComputerSystem" class 310 could be identified not just against other "ComputerSystem" 310 instances, but also any and/or all candidate classes upstream or downstream from "ComputerSystem" 310. For example, "BaseClass" 300 would be considered an "upstream" candidate class, and "Laptop" 320, "DellLaptop" 340, "VirtualSystem" 330, "UNIXVirtualSystem" 350, and "Mainframe" 360 would each be considered "downstream" candidate classes in the hierarchy shown in FIG. 3. Identification with only specific classes in a hierarchy is also possible. For example, it is possible to identify "ComputerSystem" 310 instances with other "ComputerSystem" 310 instances and "VirtualSystem" 330 instances only, rather than the full set of upstream and downstream classes within the hierarchy.

Identification processes may be based on so-called "common properties" between classes, that is, properties possessed by each class involved in the reconciliation process. In one embodiment, only common properties would be used during the identification of instances based on instance class metadata. For example, during an identification process in which "ComputerSystem" 310 instances are identified against "Laptop" 320 instances, "Laptop"-specific class properties would not be used during identification operations. With regard to FIG. 3, the "Laptop"-specific class properties, i.e., those class properties found in "Laptop" 320 instances and not "ComputerSystem" 310 instances would be "Property_SB1_1_1" and "Property_SB1_1_2." Instead, only the common properties between the two classes, "Property_1," "Property_2," "Property_SB1_1," and "Property_SB1_2" would be used by a reconciliation process attempting to identify a "ComputerSystem" 310 instance against a "Laptop" 320 instance.

Figure 4:
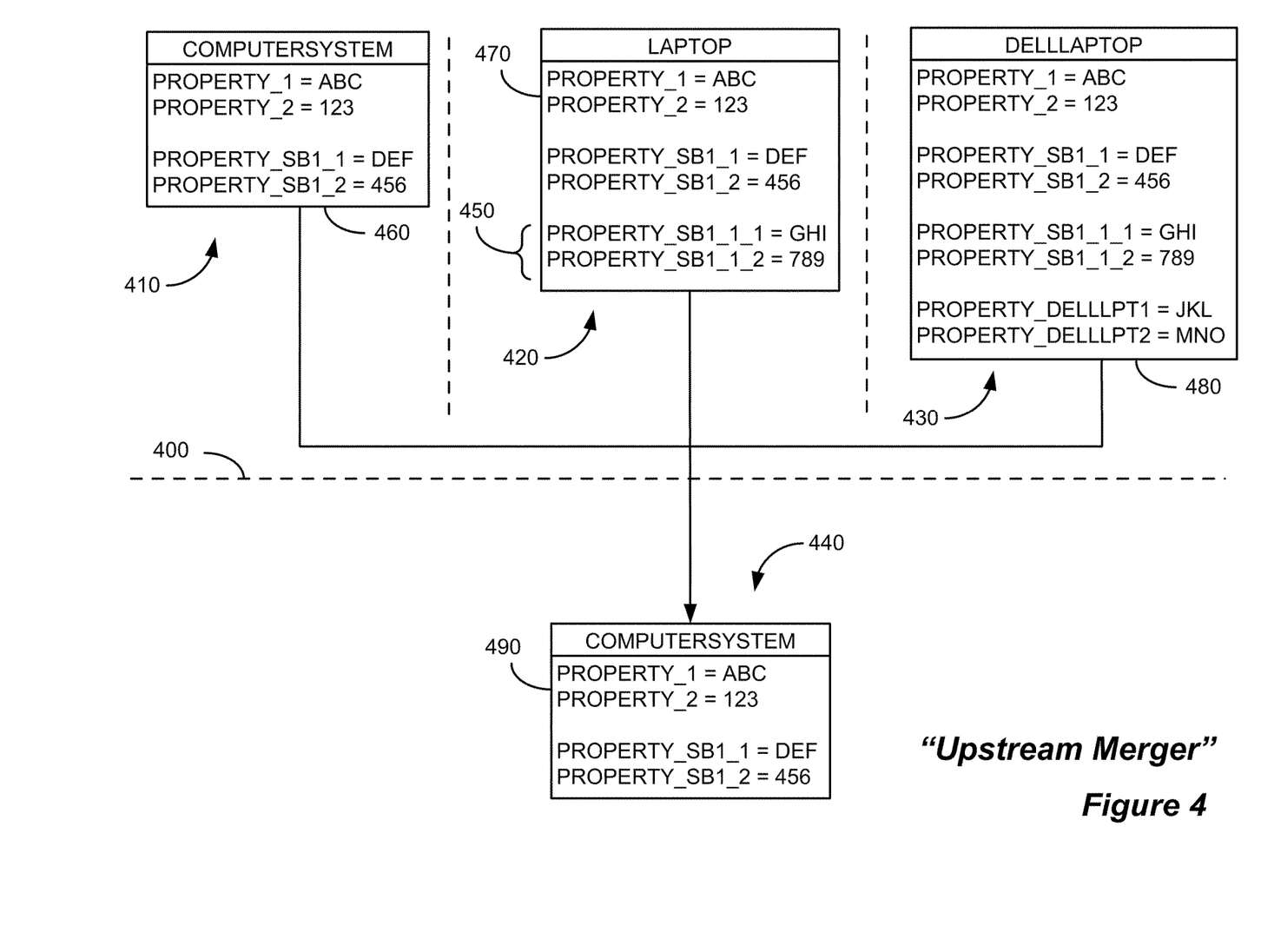
FIG. 4 shows, in block diagram form, an exemplary upstream merger process.

FIG. 4 illustrates a specific example of a so-called "upstream merger" that may occur, for example, after a resource instance has been reconciled and merged into another resource instance whose class lies higher up the class model hierarchy. In this case, there are three separate provider data partitions: 410, 420, and 430. Dashed line 400 logically separates the provider data partitions from the target data partition 440, i.e., a data partition in which providers would like to see reconciled configuration items. The target data partition 440 could comprise, for example, a pre-production dataset, production dataset, archived dataset, or test dataset, etc. In the example shown in FIG. 4, within each provider data partition, there is an instance of a Dell Laptop with identifying properties Property_1=ABC and Property_2=123. A property or combination of properties that uniquely identify an instance may also be referred to as a key property or key properties. Although each instance refers to the same "real world" laptop computer, the resource objects for this laptop computer have been instantiated at three different levels in the class model hierarchy. That is, object instance 460 has been instantiated as a "ComputerSystem" class; object instance 470 has been instantiated as a "Laptop" class; and object instance 480 has been instantiated as a "DellLaptop" class. In this particular example, object 470 from provider data partition 420 is being reconciled and merged with object 490 in the target data partition 440. In this example, object 490 is an instance of a "ComputerSystem" class, a class which is "upstream," or higher in the class hierarchy than the "Laptop" class. Another way of stating the relationship between the two classes is that "Laptop" is a subclass of "ComputerSystem." Thus, when object 470 is identified as referring to the same resource as object 490, object 470 may be merged into object 490 by the enhanced reconciliation process described herein. In the example shown in FIG. 4, "ComputerSystem" is the destination class, meaning that object 470 will lose its "Laptop"-specific class properties 450, Property_SB1_1_1 and Property_SB1_1_2, once it has been merged with object 490, which is a "ComputerSystem" object. In some embodiments, an administrator or user may be able to specify rules regarding whether or not particular losses of data are permissible during an upstream merger process. For instance, in the example shown in FIG. 4, if an administrator or user has specified that the Property_SB1_1_1 attribute should never be lost via an upstream merger process, then the merger of object 470 into object 490 would not occur, despite the fact that the two objects were identified as referring to the same real world resource.

Figure 5:
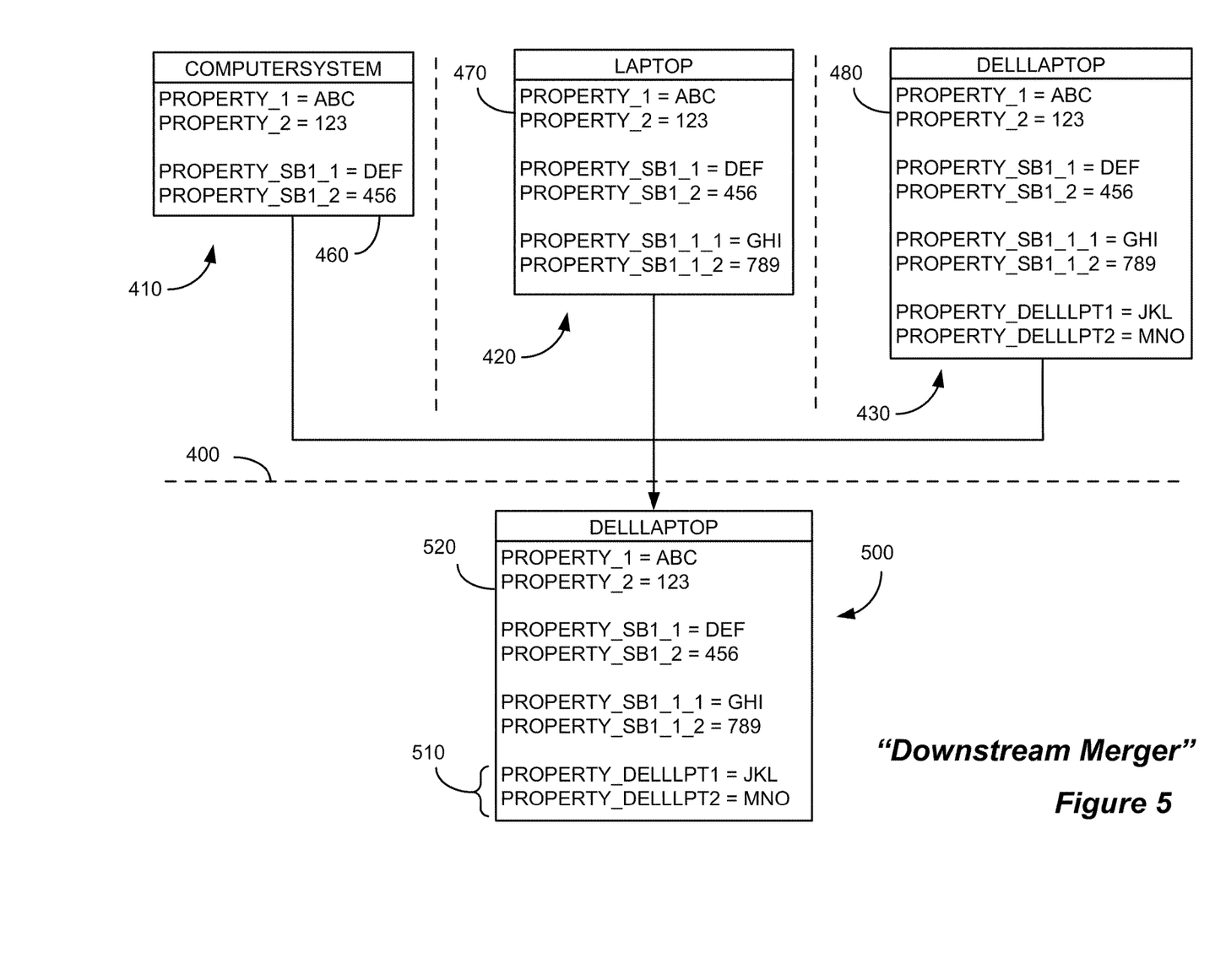
FIG. 5 shows, in block diagram form, an exemplary downstream merger process.

FIG. 5 illustrates a specific example of a so-called "downstream merger" that may occur, for example, after a resource instance has been reconciled and merged into another resource instance whose class lies further down the class model hierarchy. In this case, there are three separate provider data partitions: 410, 420, and 430. Dashed line 400 logically separates the provider data partitions from the target data partition 500. Within each provider data partition, there is an instance of a Dell Laptop with identifying properties Property_1=ABC and Property_2=123. Although each instance refers to the same "real world" laptop computer, the resource objects for this laptop computer have been instantiated at three different levels in the class model hierarchy. That is, object instance 460 has been instantiated as a "ComputerSystem" class; object instance 470 has been instantiated as a "Laptop" class; and object instance 480 has been instantiated as a "DellLaptop" class. In this particular example, object 470 from provider data partition 420 is being reconciled and merged with object 520 in the target data partition 500. In this example, object 520 is an instance of a "DellLaptop" class, a class which is "downstream," or lower in the class hierarchy than the "Laptop" class. Another way of stating the relationship between the two classes is that "DellLaptop" is a subclass of "Laptop." Thus, when object 470 is identified as referring to the same resource as object 520, object 470 may be merged into object 520 by the enhanced reconciliation process described herein. In the example shown in FIG. 5, "DellLaptop" is the destination class, meaning that object 520 may possibly already possess values for the "DellLaptop"-specific class properties 510, Property_DellLPT1 and Property_DellLPT2, which object 470 did not possess.

Figure 6:
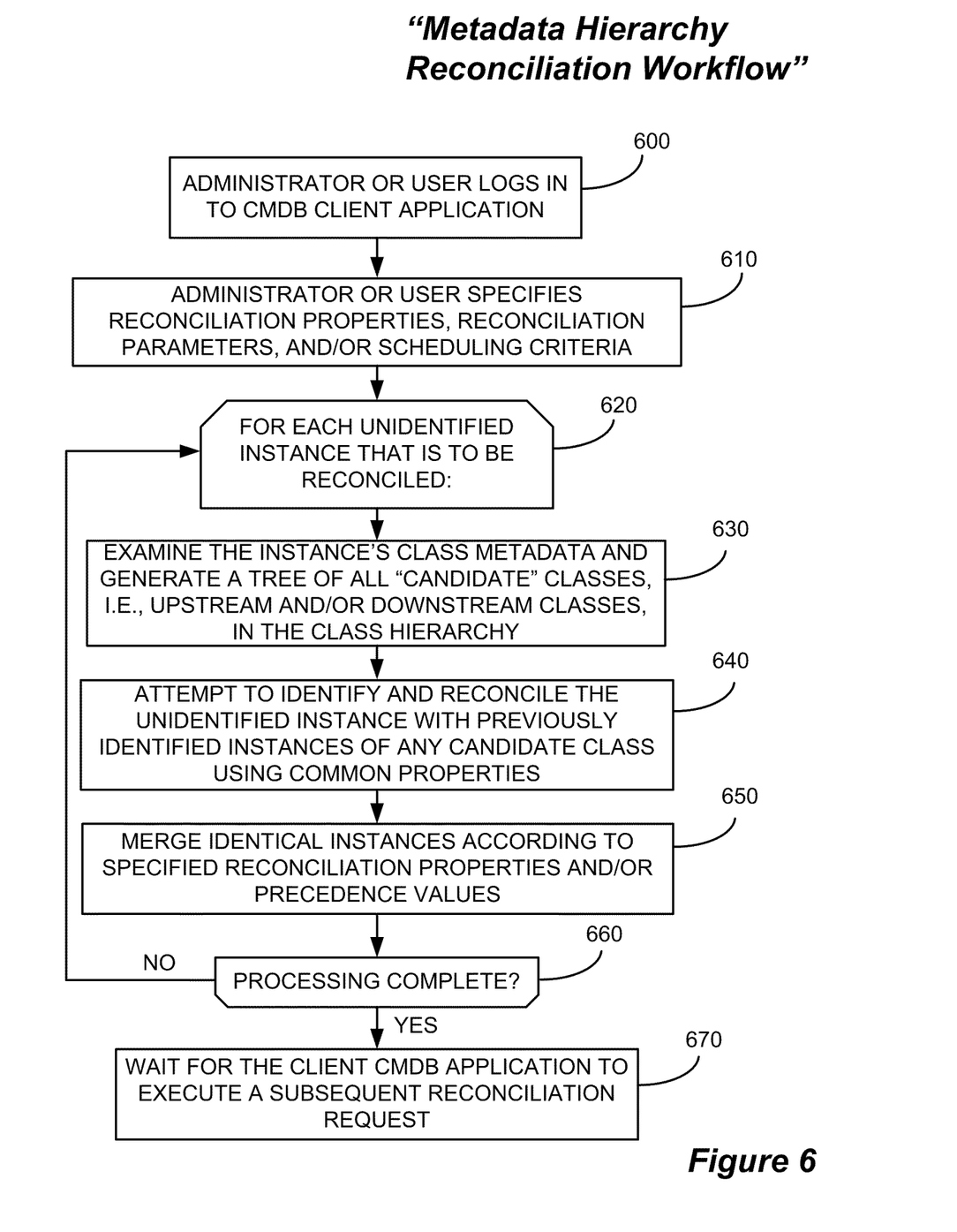
FIG. 6 shows, in flow chart form, a process for carrying out resource reconciliation with the aid of metadata hierarchy information, in accordance with one embodiment of this disclosure.

FIG. 6 illustrates, in flow chart form, a process for carrying out resource reconciliation with the aid of metadata hierarchy information, in accordance with one embodiment of the present invention. First, an Administrator or user may log in to CMDB Client Application 100 (Step 600). Next, the Administrator or user may define a reconciliation request 102, comprising various reconciliation properties (e.g., "merge upstream," "merge downstream," both, or neither), reconciliation parameters, and/or scheduling criteria for when the reconciliation request 102 will be run (Step 610). Then, for each unidentified instance that is to be reconciled (Step 620), the reconciliation process may: examine the instance's class metadata and generate a tree of all "candidate" classes, i.e., upstream and/or downstream classes in the class hierarchy (Step 630); attempt to identify and reconcile the unidentified instance with previously identified instances of any candidate class using common properties (Step 640); and merge instances according to specified reconciliation properties and/or precedence values (Step 650). When processing is complete (Step 660), the CMDB 106 can simply wait for the Client CMDB application 100 to execute a subsequent reconciliation request 102 (Step 670).

Figure 7:
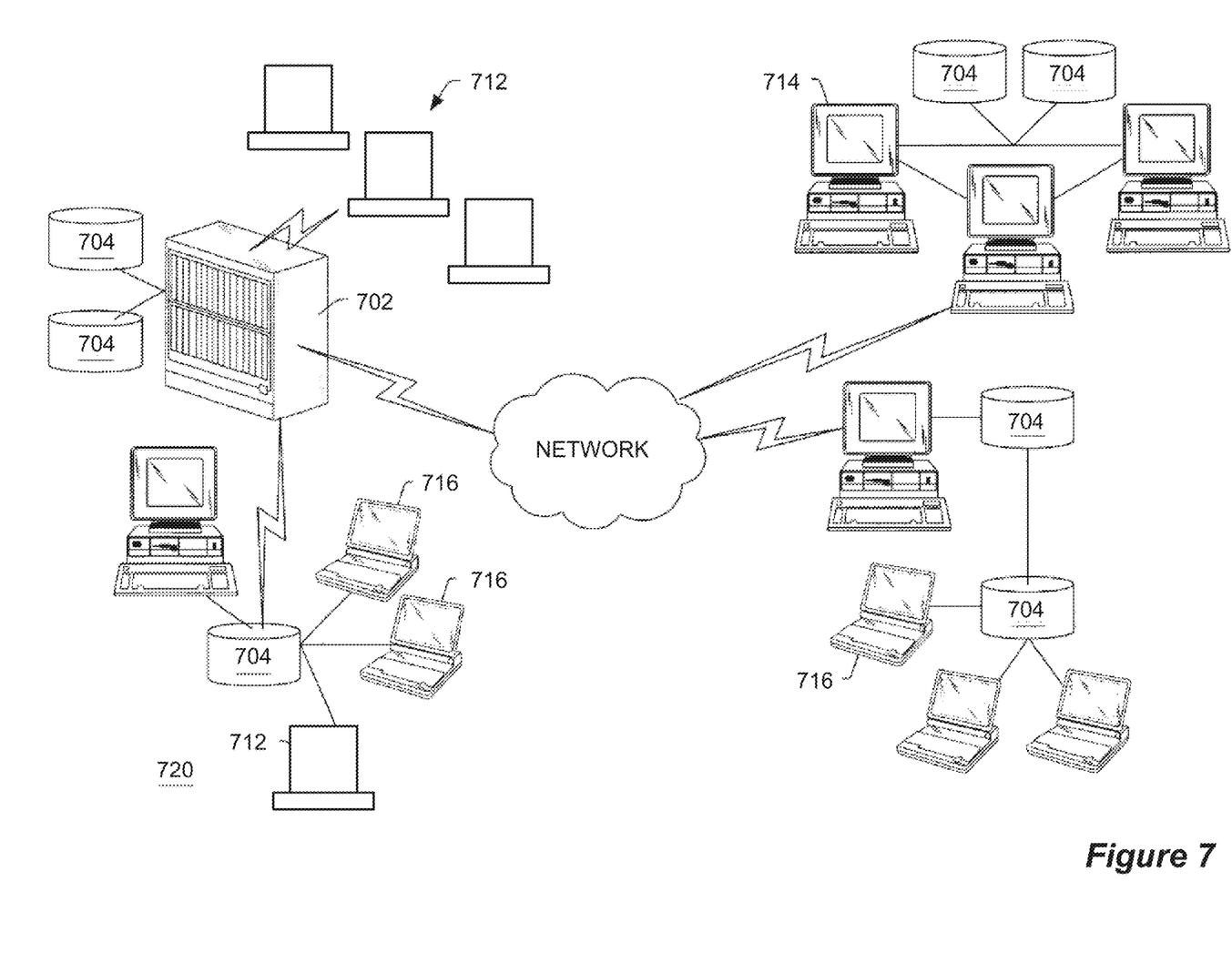
FIG. 7 shows an exemplary enterprise computing environment.

FIG. 7 illustrates an exemplary enterprise computing environment wherein one embodiment of the present invention may be installed. The CMDB 106 may be installed and running on any one or more of the computing endpoints in communication with the network shown in FIG. 7. As shown, the enterprise computing environment may include one or more computers, for example, mainframe computers 702, which each include one or more storage devices 704, also referred to as direct access storage devices (DASD). A plurality of computer systems or terminals 712 may be coupled to the mainframe computer 702, wherein the computer systems or terminals 712 access data stored in the storage devices 704 coupled to or part of the mainframe computer 102.

The mainframe computer system 702 may be coupled to one or more other computer systems and/or computer networks, including other mainframe computer systems. The mainframe computer system 702 may be coupled locally to a computer system network 720 in a local area network (LAN) configuration, or may be coupled to one or more computer systems and/or networks through a wide area network (WAN). As shown in FIG. 7, the mainframe computer system 702 may be directly coupled to a local area network 720, such as a PC-based or client/server based network. The LAN 720 may comprise a storage device or file server 704 coupled to one or more desktop computer systems 714, one or more portable computer systems 716 and possibly one or more computer systems or terminals 712. As also shown in FIG. 7, the mainframe computer 702 may also be coupled through a wide area network, represented by the "cloud" that is labeled "NETWORK" in FIG. 7, to one or more additional local area networks, such as PC-based networks as shown. Each of the PC based networks may comprise one or more storage devices or file servers 704 and one or more of either desktop computer systems 714 or portable computer systems 716. The wide area network may be any of various types, such as the Internet.

Each of the one or more mainframe computer systems 702, the computer systems 714 and 716, as well as file servers 704 may include various components as is standard in computer systems. For example, the mainframe computer system 702 may include one or more processors or CPUs, preferably multiple CPUs, as well as non-volatile memory, such as represented by elements 704, and various internal buses etc. as is well known in the art, as well as a display device. In a similar manner, each of the desktop computer systems 714 and/or portable computer systems 716, or other computer systems included within the enterprise, comprise various standard computer components including one or more CPUs, one or more buses, memory, a power supply, non-volatile memory, and a display, such as a video monitor or LCD display. The computer systems or terminals 712 may comprise standard "dumb" terminals as used with mainframes, i.e., may comprise a display and video hardware and/or memory for displaying data on the display provided from the mainframe computer system 702.

The mainframe computer system 702 may store a database comprising data which is desired to be accessible among a portion or all of the enterprise, e.g., is desired to be accessible by one or more of the computer systems 714 and 716. The database stored in the mainframe computer system 702 may be distributed among one or more of the various file servers 704 connected to the various computer systems 714 and 716. Thus, it is desired that the data comprising the database be distributed among the enterprise for ready access among multiple users. It is also possible that multiple different database management systems are used within the enterprise, e.g., one or more of the file servers 704 may store its own database which is desired to be replicated among various of the other file servers and/or the mainframe computer system 702.

One or more of the computer systems 702, 712, 714, and 716 preferably include a memory medium on which computer programs according to the invention may be stored. In addition, the memory medium may be located in a first computer in which the programs are executed, or may be located in a second different computer which connects to the first computer over a network. In the latter instance, the second computer provides the program instructions to the first computer for execution. Also, the computer systems 702/704, 712, 714, and 716 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software utility program or programs for graphically displaying database record organization characteristics as described herein. The software program(s) may be implemented in any of various ways, including procedure-based techniques, component-based techniques, and/or object-oriented techniques, among others. For example, the software program may be implemented using ActiveX® controls, C++ objects, Java® objects, Microsoft Foundation Classes (MFC), or other technologies or methodologies, as desired. (ACTIVEX is a registered trademark of the Microsoft Corporation. JAVA is a registered trademark of Sun Microsystems, Inc.) A computer system executing code and data from a memory medium comprises a means for graphically displaying database record organization according to the methods and/or block diagrams described below.

Various embodiments further include receiving or storing instructions and/or data implemented in accordance with the foregoing description upon a memory medium. Suitable memory media include a memory medium as described below, as well as signals such as electrical, electromagnetic, or digital signals, conveyed via a communication medium such as networks 702 and/or 704 and/or a wireless link.

Figure 8:
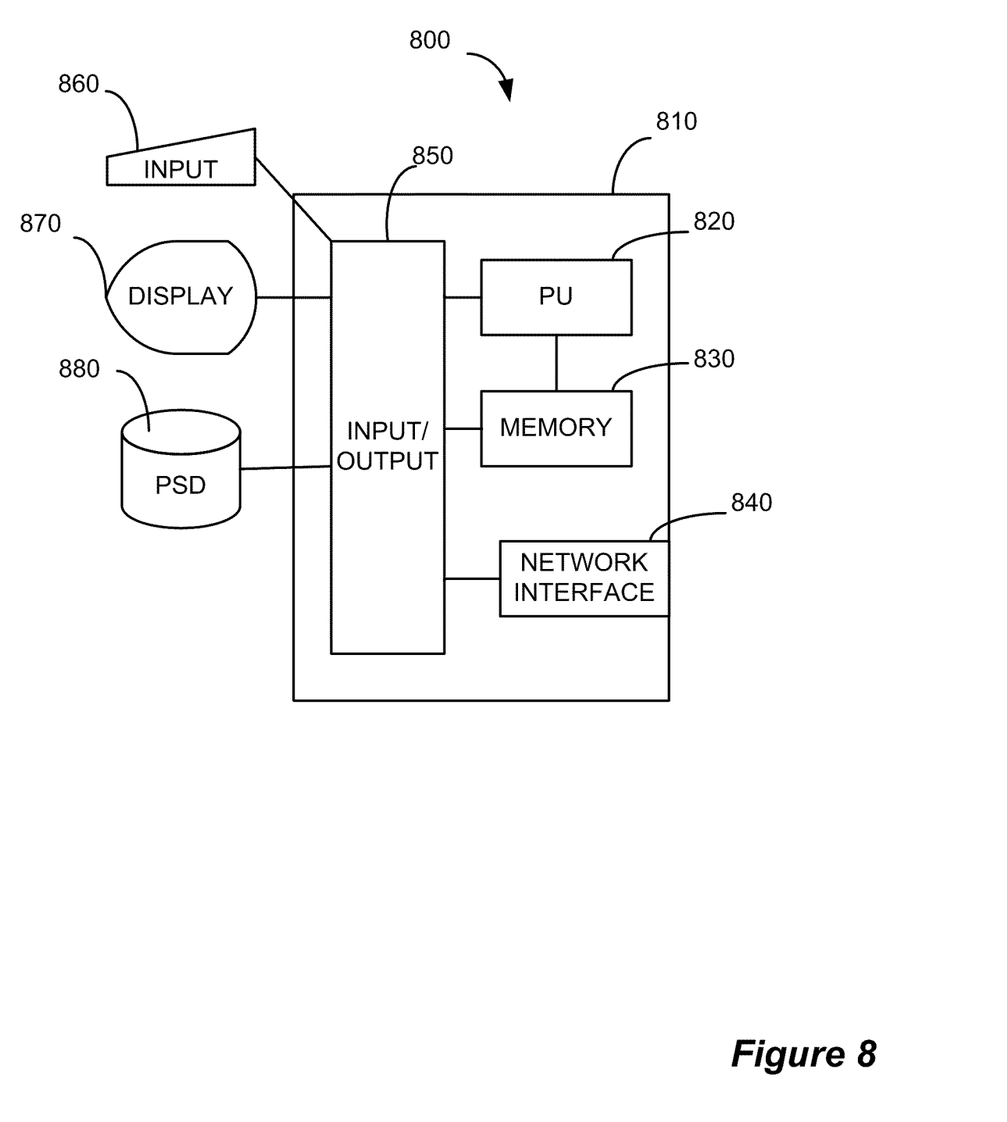
FIG. 8 shows, in block diagram form, an exemplary computer system comprising a program control device.

Referring now to FIG. 8, an exemplary computer system 800 is shown. One or more exemplary computer systems 800 may be included in a mainframe computer (e.g., Element 702 in FIG. 7). Exemplary computer system 800 may comprise a programmable control device 810 which may be optionally connected to input 860 (e.g., a keyboard, mouse, touch screen, etc.), display 870 or program storage device (PSD) 880 (sometimes referred to as direct access storage device or DASD). Also, included with program device 810 is a network interface 840 for communication via a network with other computing and corporate infrastructure devices (See FIG. 7). Note that network interface 840 may be included within programmable control device 810 or be external to programmable control device 810. In either case, programmable control device 810 will be communicatively coupled to network interface 840. Also note that program storage unit 880 represents any form of non-volatile storage including, but not limited to, all forms of optical and magnetic storage elements including solid-state storage.

Program control device 810 may be included in a computer system and be programmed to perform methods in accordance with this disclosure. Program control device 810 comprises a processor unit (PU) 820, input-output (I/O) interface 850 and memory 830. Processing unit 820 may include any programmable controller device including, for example, processors of an IBM mainframe (such as a quad-core z10 mainframe microprocessor). Alternatively, in non mainframe systems, examples of processing unit 820 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 830 may include one or more memory modules and comprise random access memory (RAM), read only memory (ROM), programmable read only memory (PROM), programmable read-write memory, and solid state memory. One of ordinary skill in the art will also recognize that PU 820 may also include some internal memory including, for example, cache memory.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIG. 6 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIG. 6 may be performed by an exemplary computer system 800 comprising a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium" or "computer useable medium," that are suitable for tangibly embodying program instructions may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices. However, those of ordinary skill in the art will recognize that information may also be maintained as structured text, binary object data (e.g., binary data structures), HTML, XML, or other forms of storing data.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising a programmable control device programmed to perform resource reconciliation for a configuration management database (CMDB) having a plurality of data partitions stored in a memory medium, the memory medium having instructions that, when executed, cause the programmable control device to perform the resource reconciliation, comprising:
   receiving a request to perform resource reconciliation by identifying one or more unidentified resources of configuration objects against previously identified resources of configuration objects of any candidate class, wherein:
      the request includes criteria specifying when to perform the resource reconciliation, and
      the request specifies a qualification set that restricts unidentified resource instances to unidentified resource instances that match one or more attribute values defined by the qualification set, the qualification set being reusable for subsequent requests to perform resource reconciliation;
   responsive to a match of the one or more attribute values defined by the qualification set, accessing the one or more unidentified resources stored within one of the data partitions in the CMDB;
   determining all candidate classes for each of the one or more unidentified resources, wherein:
      all candidate classes are obtained from a class hierarchy model defining parent classes and subclasses, and
      all candidate classes are selected by identifying upstream and identifying downstream to include classes upstream and classes downstream from the one or more unidentified resources;
   identifying each of the one or more unidentified resources as matching previously identified resources stored within another data partition in the CMDB by:
      using common properties of the candidate classes, and
      applying rules from an identification rule set to instances of the previously identified resources from any of the candidate classes, including classes that are a same as the one or more unidentified resources and classes that are different from the one or more unidentified resources;
   tagging matching instances between the one or more unidentified resources and the instances of the previously identified resources from the different data partition with a same reconciliation identity, wherein the reconciliation identity is an additional attribute to indicate the matching instances represent a same item;
   merging each of the one or more unidentified resources with a corresponding previously identified resource having the same reconciliation identity into a merged resource; and
   writing each of the one or more merged resources to a target data partition in the CMDB.

2. The computer system of claim 1, wherein the identifying further comprises matching on only the common properties between the one or more unidentified resources and the instances of the previously identified resources from the different data partition.

3. The computer system of claim 1, wherein the programmable control device is further programmed to perform the resource reconciliation in response to a creation of a new resource.

4. The computer system of claim 1, wherein the programmable control device is further programmed to perform the resource reconciliation at specified intervals.

5. The computer system of claim 1, wherein the CMDB comprises a reconciliation engine configured to initiate the resource reconciliation according to one or more specified reconciliation properties.

6. The computer system of claim 1, wherein the one or more specified reconciliation properties comprise a selection of at least one of the following options: identify downstream, identify upstream, identify downstream and upstream, and identify resources of the same class only.

7. The computer system of claim 1, wherein the one or more specified reconciliation properties comprise a specification of individual candidate classes during the identifying.

8. A non-transitory computer-usable memory medium having computer-readable program code embodied therein, wherein the computer-readable program code is adapted to be executed to:
receive a request to perform resource reconciliation by identifying one or more unidentified resources of configuration objects against previously identified resources of configuration objects of any candidate class, wherein:
the request includes criteria specifying when to perform the resource reconciliation, and
the request specifies a qualification set that restricts unidentified resource instances to unidentified resource instances that match one or more attribute values defined by the qualification set, the qualification set being reusable for subsequent requests to perform resource reconciliation;
responsive to a match of the one or more attribute values defined by the qualification set, access the one or more unidentified resources stored within a first data partition of a configuration management database (CMDB);
determine all candidate classes for each of the one or more unidentified resources, wherein:
all candidate classes are obtained from a class hierarchy model defining parent classes and subclasses, and
all candidate classes are selected by identifying upstream and identifying downstream to include classes upstream and classes downstream from the one or more unidentified resources;
identify each of the one or more unidentified resources as matching previously identified resources stored within a second data partition in the CMDB by:
using common properties of the candidate classes, and
applying rules from an identification rule set to instances of the previously identified resources from any of the candidate classes, including classes that are a same as the one or more unidentified resources and classes that are different from the one or more unidentified resources;
tag matching instances between the one or more unidentified resources and the instances of the previously identified resources from the different data partition with a same reconciliation identity, wherein the reconciliation identity is an additional attribute to indicate the matching instances represent a same item;
merge each of the one or more unidentified resources with a corresponding previously identified resource having the same reconciliation identity into a merged resource; and
write each of the one or more merged resources to a target data partition in the CMDB.

9. The computer usable memory medium of claim 8, wherein the computer readable program code is further adapted to be executed in response to a creation of a new resource.

10. The computer usable memory medium of claim 8, wherein the computer readable program code is further adapted to be executed at specified intervals.

11. The computer usable memory medium of claim 8, wherein the resource reconciliation is initiated by one or more specified reconciliation properties, wherein the one or more reconciliation properties comprise a selection of at least one of the following options:
identify downstream, identify upstream, identify downstream and upstream, and identify resources of the same class only.

12. The computer usable memory medium of claim 8, wherein the one or more specified reconciliation properties comprise a specification of individual candidate classes to identify the one or more unidentified resources against.

13. The computer usable memory medium of claim 8, wherein the CMDB comprises a reconciliation engine configured to initiate the resource reconciliation according to the one or more specified reconciliation properties.

14. A resource reconciliation method for a configuration management database (CMDB) having a plurality of data partitions stored in a memory medium, the method comprising:
receiving a request to perform resource reconciliation by identifying one or more unidentified resources of configuration objects against previously identified resources of configuration objects of any candidate class, wherein:
the request includes criteria specifying when to perform the resource reconciliation, and
the request specifies a qualification set that restricts unidentified resource instances to unidentified resource instances that match one or more attribute values defined by the qualification set, the qualification set being reusable for subsequent requests to perform resource reconciliation;
responsive to a match of the one or more attribute values defined by the qualification set, accessing the one or more unidentified resources stored within one of the data partitions in the CMDB;
determining all candidate classes for each of the one or more unidentified resources, wherein:
all candidate classes are obtained from a class hierarchy model defining parent classes and subclasses, and
all candidate classes are selected by identifying upstream and identifying downstream to include classes upstream and classes downstream from the one or more unidentified resources;
identifying each of the one or more unidentified resources as matching previously identified resources stored within another data partition in a CMDB by:
using common properties of the candidate classes, and
applying rules from an identification rule set to instances of the previously identified resources from any of the candidate classes, including classes that are a same as the one or more unidentified resources and classes that are different from the one or more unidentified resources;

tagging matching instances between the one or more unidentified resources and the instances of the previously identified resources from the different data partition with a same reconciliation identity, wherein the reconciliation identity is an additional attribute to indicate the matching instances represent a same item;

merging each of the one or more unidentified resources with a corresponding previously identified resource having the same reconciliation identity into a merged resource; and writing each of the one or more merged resources to a target data partition in the CMDB.

15. The method of claim 14, wherein the resource reconciliation is initiated by one or more specified reconciliation properties, wherein the one or more reconciliation properties comprise a selection of at least one of the following options: identify downstream, identify upstream, identify downstream and upstream, and identify resources of the same class only.

16. The method of claim 14, wherein the one or more specified reconciliation properties comprise a specification of individual candidate classes to identify the one or more unidentified resources against.

17. The method of claim 14, wherein the CMDB comprises a reconciliation engine configured to initiate the resource reconciliation according to the one or more specified reconciliation properties.

18. A computer network executing a resource reconciliation method for a configuration management database (CMDB) having a plurality of data partitions stored in a memory medium, the computer network comprising:
one or more non-volatile storage devices for maintaining configuration management information; and
one or more computer systems communicatively coupled to the network, at least one of the one or more computer systems programmed to perform at least a portion of a method comprising:
receiving a request to perform resource reconciliation by identifying one or more unidentified resources of configuration objects against previously identified resources of configuration objects of any candidate class, wherein:
the request includes criteria specifying when to perform the resource reconciliation, and
the request specifies a qualification set that restricts unidentified resource instances to unidentified resource instances that match one or more attribute values defined by the qualification set, the qualification set being reusable for subsequent requests to perform resource reconciliation;
responsive to a match of the one or more attribute values defined by the qualification set, accessing the one or more unidentified resources stored within one of the data partitions in the CMDB;
determining all candidate classes for each of the one or more unidentified resources, wherein:
all candidate classes is obtained from a class hierarchy model defining parent classes and subclasses, and
all candidate classes are selected by identifying upstream and identifying downstream to include classes upstream and classes downstream from the one or more unidentified resources;
identifying each of the one or more unidentified resources as matching previously identified resources stored within another data partition in the CMDB by:
using common properties of the candidate classes, and
applying rules from an identification rule set to instances of the previously identified resources from any of the candidate classes, including classes that are a same as the one or more unidentified resources and classes that are different from the one or more unidentified resources;
tagging matching instances between the one or more unidentified resources and the instances of the previously identified resources from the different data partition with a same reconciliation identity, wherein the reconciliation identity is an additional attribute to indicate the matching instances represent a same item;
merging each of the one or more unidentified resources with a corresponding previously identified resource having the same reconciliation identity into a merged resource; and
writing each of the one or more merged resources to a target data partition in the CMDB,
wherein the entire method is performed collectively by the one or more computer systems communicatively coupled to the network.

19. The computer network of claim 18, further comprising:
a target data partition, wherein the target data partition is associated with one or more resource objects of the another data partition in the CMDB; and
a plurality of provider data partitions, wherein each of the plurality of provider data partitions is associated with one or more resource objects.

20. The computer network of claim 18, wherein the plurality of provider data partitions exist on a single computer system.

21. The computer network of claim 18, wherein the plurality of provider data partitions do not all exist on a single computer system.

22. The computer network of claim 18, further comprising a reconciliation engine, wherein the reconciliation engine is configured to initiate the resource reconciliation according to one or more specified reconciliation properties.

23. The computer network of claim 18, wherein the resource reconciliation method is configured to be executed in response to a creation of a new resource.

24. The computer network of claim 18, wherein the resource reconciliation method is configured to be executed at specified intervals.

* * * * *